UNITED STATES PATENT OFFICE.

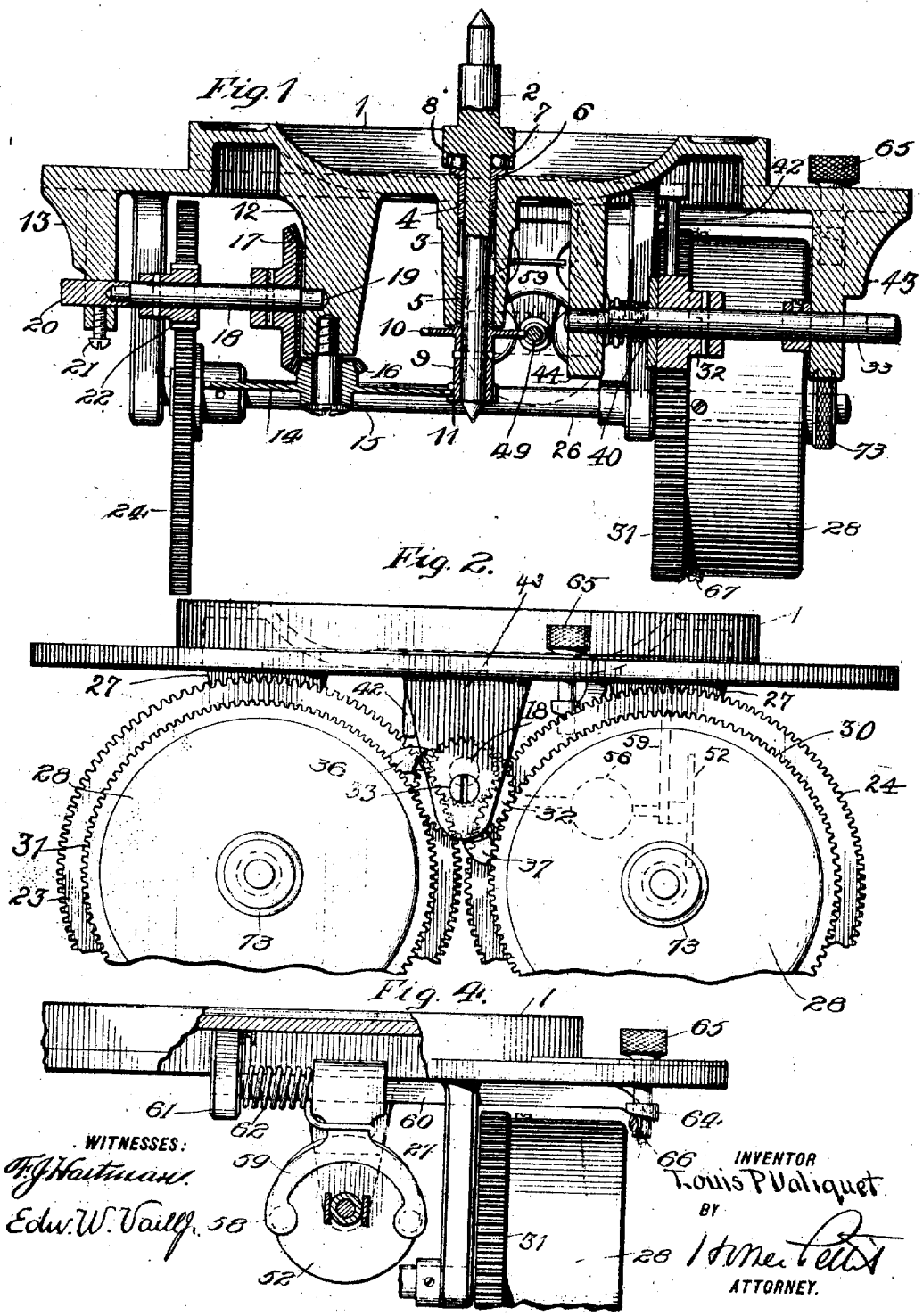

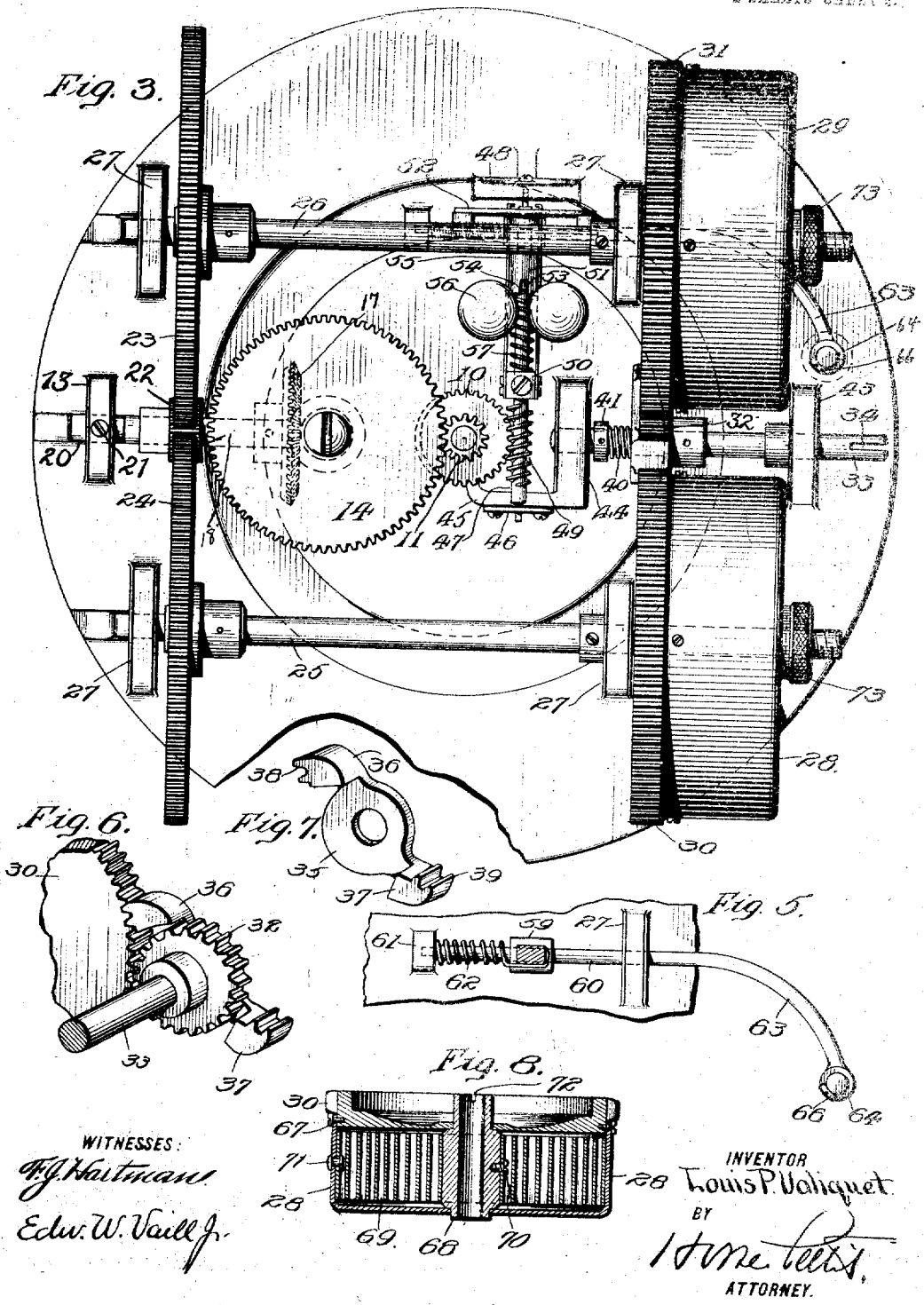

LOUIS P. VALIQUET, OF NEW YORK, N. Y., ASSIGNOR TO VICTOR TALKING MACHINE COMPANY, A CORPORATION OF NEW JERSEY.

MOTOR FOR TALKING-MACHINES.

987,272. Specification of Letters Patent. Patented Mar. 21, 1911.

Application filed May 3, 1904. Serial No. 206,116.

*To all whom it may concern:*

Be it known that I, LOUIS P. VALIQUET, a citizen of the United States, and a resident of the city of New York, State of New York, have invented certain new and useful Improvements in Motors for Talking-Machines, of which the following is a full, clear, and complete disclosure.

The object of my invention is to generally improve the construction of talking machine motors, so that said motors will run with greater efficiency of power, decreased friction and for a greater length of time than has heretofore been made possible in machines of this class.

Briefly, my invention comprises a plurality of spring barrels and springs, which are so geared as to be wound by a single winding shaft, and which may, however, operate independently should one of said spring barrels become inoperative.

My invention also comprises an arrangement of certain gears and shafts so that the same may be removable without interfering with adjacent connecting parts.

My invention also comprises other improvements in the construction and arrangement of parts as will hereafter be more fully described and pointed out in the claims.

For a full, clear and exact description of this form of my invention, reference may be had to the following specification, and to the accompanying drawings forming a part thereof, in which—

Figure 1 is a central, vertical, sectional view of the motor mechanism showing the general arrangement of parts; Fig. 2, an end elevation of the same, showing that end of the motor to which the winding crank is applied; Fig. 3, an inverted plan view of the motor and its supporting plate; Figs. 4 and 5, detailed views of parts of the centrifugal governor for the motor; Figs. 6 and 7, perspective views of the pawl for locking the spring barrels; and Fig. 8, a transverse, sectional view of one of the spring barrels detached from the motor.

In the drawings the supporting plate 1, having the central recess in its upper surface, is preferably circular in outline and is adapted to be retained in a corresponding opening in the hinged cover of the motor casing in the usual manner.

The numeral 2 indicates the main spindle or shaft upon which the turntable or record carrier is adapted to be secured in any suitable manner. The shaft 2 passes through the hollow sleeve 3, which depends from the recessed portion of the supporting plate 1 and is preferably integral therewith, and which is provided with interior bearings or bushings 4 and 5. The upper end of the bushing 4 is flanged at 6 and adapted to form a seat for the bearing balls 7, which receive the longitudinal weight of the shaft and table; suitable races being formed in the enlarged portion of the shaft 2, which is disposed within the recess in said plate 1, as indicated at 8, to receive the bearing balls 7. In this manner the spindle or shaft 2 and the parts carried thereby are mounted on an anti-friction thrust bearing, and said spindle provides a shoulder substantially in a plane with the plane of the upper surface of said plate for supporting the turn-table, not shown. The shaft 2 has rigidly attached to its lower end a sleeve 9, which carries two gears 10 and 11, the former of which is adapted to form a connection with the centrifugal governor, as will be more fully pointed out hereafter, and the latter of which will form a part of a train through which the power from the motor springs is transmitted. Also depending from the plate 1, are supporting posts 12 and 13. The post 12 carries at its lower end a suitable bearing or stud for the gear 14 which meshes with the gear or pinion 11, above mentioned. Upon the hub 15 of the gear 14 is also mounted a beveled pinion 16, which meshes with a beveled gear 17 fixed on the horizontal shaft 18. The shaft 18 has one end journaled in the post 12, as indicated at 19, while its opposite end is journaled in a removable bearing block 20, carried by the post 13, and adjustably held therein by means of the screw 21. The shaft 18 also carries a pinion 22 which is fixed thereto, and which is adapted to mesh with two large gears 23 and 24, which gears are carried respectively by parallel, horizontal shafts 25 and 26, which are supported in suitable bearing posts, as indicated at 27. The shafts 25 and 26 also carry spring barrels 28 and 29, which are connected with the gears 30 and 31 respectively. The gears 30 and 31, and internal construction of the spring barrels, will be hereafter more fully described. The gears 30 and 31 are adapted to mesh with the pinion 32 which is mounted on a short winding shaft 33; said winding shaft being slotted to receive the key of the usual winding crank, as indicated at 34. The shaft 33 also carries the pawl for holding the gears 30 and 31 in position when the springs are not being wound. This pawl comprises a plate or disk like support 35, which has two projecting arms 36 and 37, which terminate in gear teeth 38 and 39. The arms 36 and 37 are offset, so that when the support 35 is in place upon the shaft 33, with its face in contact with one side of the pinion 32, said arms will come opposite the gears 30 and 31, so that the sets of teeth 38 and 39 will mesh respectively with the teeth of the gears 30 and 31, when the gear 32 is moved in an anti-clock-wise direction, as in Fig. 6. For forcing the pawl support 35, in contact with the pinion 32, I provide a helical spring 40, which is confined in its position upon the shaft 33, by means of a collar or a similar device 41.

It will be seen that the frictional contact between the pawl support 35 and the pinion 32, will cause the teeth of the pawl to be disengaged from their respective gears when the shaft is turned in one direction, and said pawl will reëngage said gears when said shaft is turned in the opposite direction. Thus a noiseless and positively acting, holding device is provided for the gears 30 and 31, when the motor springs are not being wound. The movement of the pawls 36 and 37 is limited by a suitable stop, such as a pin 42, depending from the supporting plate 1. This stop gives just sufficient play to the pawls to allow the gears to be rotated without contacting with the same when the pinion 32 is turned in one direction, but so that said gears will be immediately reëngaged by the pawls when the pinion is rotated in the opposite direction.

The centrifugal governor used with this form of spring motor is similar to that described and claimed in my prior application filed October 1, 1903, Serial No. 175,302, and is applied in the following manner:— The shaft 33 being supported in suitable hangers or posts 43 and 44, the post 44 of which has a lateral projection 45 which carries a bearing plate 46 for the shaft 47 of the centrifugal governor. The shaft 47 is supported at its other end by a post 48, which also depends from the plate 1. Said shaft 47 has, adjacent one end thereof, a screw-thread or worm gear 49, which meshes with the gear 10, and adjacent which is a fixed collar 50. Adjacent the other end of said shaft 57 is a slidable sleeve 51, which carries at its outer end a circular disk 52. The inner end of the sleeve 51 is provided with a pair of slots or recesses 53, which engage a transverse pin 54 on the shaft 47, said pin and slot forming a coupling between the sleeve 51 and the shaft 47. The sleeve 51 is connected with the collar 50 by means of spring strips 55, which carry the ordinary governor balls or weights 56. A coiled spring 57 surrounds the shaft 47 between the collar 50 and the sleeve 51, and tends to force the latter outwardly with the disk 52. The disk 52 is adapted to contact with brake shoes or pads 58, which are carried upon a semi-circular yoke 59, which is fixed upon a horizontal shaft 60, having bearings in the hanger or support 61 and the post or hanger 27. Said shaft 60 is provided with a coiled spring 62, one end of which engages the neck of the yoke 59, and the other end of which is held by the plate 1. The yoke 59 and the pads 58 are, therefore, kept under spring tension by a pressure in the direction of the disk 52. The outer end of the shaft 60 is curved or bent, as shown at 63, and carries upon its end a collar 64, which has an inclined surface on its lower side. Passing through an opening in the plate 1, is a pin 65, having a milled head, and which is provided on its lower end with a suitable stop 66, which is adapted to bear on the under side of the collar 64, which surrounds said pin. It will be seen by this construction of the governor and regulator that as the milled head of the pin 65 is turned so that the stop 66 travels from a narrow portion to a wide portion of the collar 64 on the inclined surface, the brake pads or shoes 58 will be retracted from the brake disk 51, and the motor be allowed to run at a greater speed. The opposite turn of the pin 65 will produce the opposite effect.

The construction of the driving spring and the spring barrel comprises the following arrangement of parts:—The spring barrel 28 consists of a metallic drum which is open at one end and is attached at said end to the gear 30 by means of screws or other suitable devices 67. Said gear 30 and the spring barrel 28 are respectively mounted for rotation on the reduced opposite ends of the barrel arbor or sleeve 68, which is adapted to turn in said parts. The driving spring 69 is attached at one end, as indicated at 70, to the barrel arbor or sleeve 68, and its opposite end is attached to the spring barrel, as indicated at 71. The end of the barrel arbor is provided with suitable recesses 72, which are adapted to engage corresponding projections, or keys, on the shafts 25 and 26, the spring barrels for each shaft being identical in construction. The slot or recess in the end of the barrel arbors and the coöperating keys or projections on the shaft together form a coupling between the barrel and shaft and afford a means whereby the said barrel may be detached from the shaft without disturbing the rest of the motor as is again referred to below.

In assembling the device, the spring barrels are placed upon the shafts 25 and 26, so that the recesses 72 engage their corresponding keys, and thumb-nuts 73 are then screwed upon the ends of said shafts to hold the barrel arbors carrying the spring barrels in position thereon. Since both of the gears 30 and 31 mesh with the pinion 32, either one of the driving springs are effective to drive the motor independently of the other, and should one become broken the motor will be driven by the remaining spring, until a new one is provided in place of the broken one. When it is desired to substitute a new spring and spring barrel for one which has been rendered inoperative in any manner, it is only necessary to allow the motor to run down to release the tension on the springs, after which the spring barrels may be easily removed from their shafts, after simply unscrewing the thumb-nuts 73.

From the construction of parts above described, it will be seen that I have provided an exceedingly simple and efficient form of motor, in which the parts are easily removable and interchangeable, while at the same time the parts are compact without being inaccessible from the under side of the motor, when the cover of the motor casing is in its raised position. Furthermore, by having the inner end of the driving spring attached to the barrel arbor, the gears 30 and 31 are not active except in winding the motor, which greatly reduces the amount of friction over the construction where the spring is wound from its inner end and the outer end used to drive the motor.

Having just described my invention, it will be obvious that certain changes may be made in the form and arrangement of parts, and different mechanical equivalents may be used without departing from the spirit and scope of my invention, but

What I claim and desire to protect by Letters Patent of the United States, is—

1. In a talking machine motor, the combination with the main driving spindle, a bearing sleeve therefor, a ball thrust bearing located at the upper end of said sleeve and gears carried by said spindle adjacent the lower end of said sleeve, a centrifugal governor, power mechanism and gearing connecting said power mechanism with one of said gears, the other of said gears being connected with the centrifugal governor.

2. In a talking machine motor, the combination with the main driving spindle, of a bearing sleeve therefor, a ball thrust bearing adjacent the upper end of said sleeve, a sleeve carried by the lower end of said spindle having two gears located thereon, a centrifugal governor, power mechanism, and a power transmitting train, which connects with one of the gears on said sleeve, the other of said gears being connected with the centrifugal governor.

3. In a motor, a supporting plate, a sleeve depending therefrom, a spindle supported in said sleeve, a ball thrust bearing in unitary relation with said spindle supported by said plate, a governor, and driving mechanism suitably geared to said spindle.

4. In a motor, a driving spindle suitably suspended and having a sleeve secured to its lower end, said sleeve being provided with a plurality of gears integral therewith, a governor operated by one of said gears and driving mechanism connected with another of said gears.

5. In a motor, a supporting plate provided with a dished portion, a driving spindle rotatably suspended from said plate in said dished portion, said spindle having an annular shoulder thereon bearing on said plate below the plane of the upper surface of said plate, a governor, and driving mechanism suitably geared to said spindle.

6. In a motor, a supporting plate provided with a recess in its upper surface, a driving spindle rotatably suspended from said plate and having an enlarged portion located within said recess and bearing on said plate below the plane of the upper surface of said plate, a governor, and driving mechanism suitably geared to said spindle.

7. In a motor, the combination with a rotary spindle having its opposite ends free, of a ball thrust bearing intermediate of the ends of said spindle, a sleeve having gears mounted on said spindle local to one end thereof, a governor, driving mechanism, and gearing connected to said governor through the gears on said spindle and arranged to rotate said spindle.

8. In a motor, a supporting plate provided with a recess in its upper surface, and a driving spindle having an annular portion with a ball thrust bearing on said plate, the upper face of said enlarged portion being substantially in a plane coincident with the plane of the upper surface of said plate, a governor, and driving mechanism suitably geared to said spindle.

9. In a spring motor for talking machines, a plurality of driving springs, winding gears connected with said driving springs, a winding pinion meshing with the said gears, and a double pawl in frictional contact with said pinion and adapted to engage said gears when said pinion is rotated in one direction and to be disengaged from said gears when said pinion is rotated in the opposite direction, and means for rotating said pinion.

10. In a spring motor for talking machines, a plurality of driving springs, winding gears connected with said driving springs, a winding pinion with which said gears mesh, a part adapted to frictionally engage said pinion, said part having a plurality of arms terminating in teeth adapted to engage each of said gears, and means for rotating said pinion.

11. In a spring motor for talking machines, a plurality of driving springs, winding gears connected with said driving springs, a pinion with which said gears are adapted to mesh, a part in frictional engagement with said pinion having a plurality of arms terminating in teeth adapted to engage said gears, a spring for keeping said part in contact with said pinion and means for rotating said pinion.

12. In a talking machine motor, the combination with a pair of driving shafts, of a spindle geared to said shafts, spring driving mechanism on each of said shafts provided with winding gears, a single winding shaft for simultaneously winding the spring driving mechanism on said respective shafts, and means frictionally actuated by the rotation of said winding shaft, and carried thereby, operative to engage said gears when said winding shaft is rotated in one direction and to disengage said gears when said winding shaft is rotated in the opposite direction.

13. In a motor, a driving shaft, driving mechanism for said shaft, gears mounted in a common plane and actuated by said driving mechanism, a pinion connecting said gears, a shaft for said pinion, and a double-ended pawl arranged to be shifted to engage each of said gears by frictional engagement with said pinion when rotated in one direction and frictionally shifted by said pinion to disengage said gears when rotated in the opposite direction.

14. In a motor, a pair of parallel driving shafts, winding gears mounted thereon, a winding shaft provided with a pinion meshing with said winding gears and an annular disk mounted on said winding shaft and held in frictional contact with said pinion, said annular disk being provided with radially extending arms forming pawls engaged with said winding gears.

15. In a motor, a driving spring, a winding gear connected with said spring, a winding shaft, a pinion mounted on said winding shaft and meshing with said gear, a pawl loosely supported on said shaft and frictionally engaging said pinion and having a plurality of teeth operative to be moved into and out of mesh with the teeth of said gear by said pinion, and means for limiting the movement of said pawl away from said gear.

16. In a talking machine motor, the combination with a main driving spindle, of a supporting plate therefor, a thrust bearing located upon the outer side of said plate, gears carried by the free end of said spindle, a centrifugal governor, power mechanism, and gearing connecting said power mechanism with one of said gears, the other of said gears being connected with the centrifugal governor.

17. In a talking machine motor, the combination with the main driving spindle, of a supporting plate therefor, a thrust bearing adjacent the outer side of said plate, a sleeve carried by the inner free end of said spindle having two gears located thereon, a centrifugal governor, power mechanism and a power transmitting train which connects with one of the gears on said sleeve, the other of said gears being connected with the centrifugal governor.

18. In a talking machine motor, the combination with a supporting plate, of a main driving shaft rotatably mounted therein, a pair of parallel shafts rotatably supported upon said plate, a gear loosely mounted upon one end of each of said shafts, and a spring connection between each gear and its shaft, a winding gear meshing with both of said gears, and means to lock said gears in a fixed position, gears upon the opposite ends of said shafts rigidly secured thereon, a pinion intermeshing with said last mentioned gears, a shaft carrying said pinion and rotated thereby, a governor and means between said last mentioned shaft and said governor and between said last mentioned shaft and said main driving shaft for driving the same.

19. In a motor, the combination with a rotatable driving shaft, of a sleeve slidably mounted thereon, said sleeve having reduced ends, a gear mounted upon one of said reduced ends and rotatable with respect thereto, and having a cylindrical boss, a spring barrel secured to said boss and journaled upon the other of said ends, and a spring having its opposed ends respectively secured to said barrel and said sleeve.

20. In a talking machine motor, a pair of driving shafts, a spindle geared to said shafts, a spring driving mechanism on each of said shafts provided with winding gears, a single winding shaft, a pinion rigidly mounted upon said shaft for simultaneously winding both spring driving mechanisms, a pawl engaging said winding gears and comprising two oppositely projecting arms loosely mounted upon said winding shaft and engaging against the side of the said pinion, and yielding means to hold said pawl in frictional engagement against the side of said pinion, whereby said winding shaft is free to be rotated in one direction to wind up the spring driving mechanism, said pawl being inoperative during said winding movement, but being automatically thrown into engagement to prevent the unwinding of the said winding pinion.

21. In a talking machine motor, a pair of parallel driving shafts, a bearing for each shaft, the end of each shaft extending freely outwardly from its bearing, a spring driving mechanism mounted upon the free end of each shaft, a retaining member to hold each driving mechanism in position, spring winding mechanism for said spring driving mechanisms and a single winding shaft for simultaneously operating both spring winding mechanisms located between said mechanisms, and extending outwardly in the direction of, and parallel to the free ends of said driving shafts, said driving mechanisms being freely removable from said driving shafts upon the removal of said retaining members.

22. In a motor, a driving shaft suitably mounted, a sleeve rigidly secured on said shaft, a gear loosely journaled on said sleeve independent of said shaft, a spring casing connected with said gear, a coiled spring secured at its outer end to said spring casing and at its inner end to said sleeve.

23. In a motor, a driving shaft suitably mounted, a sleeve mounted on said shaft and interlocked therewith, a winding gear and a spring casing rotatably mounted to rotate on said sleeve independent of said shaft, and a coiled spring in said casing having its outer end secured to said casing and its inner end secured to said sleeve.

24. In a motor, the combination with a rotary spindle, of a ball thrust bearing intermediate of the ends of said spindle, a plurality of gears carried by said spindle, a stationary bearing sleeve embracing said spindle intermediate of said gears and said bearing, and forming a bearing for said spindle, a governor, driving mechanism, and gearing connecting said driving mechanism with said governor through the gearing on said spindle, to contemporaneously actuate said spindle and governor.

25. In a motor, a driving shaft rotatably supported on spaced hangers and having a free end extending beyond said hangers, a sleeve mounted on said free end, means for rigidly connecting said sleeve to said shaft, a winding gear loosely mounted on said sleeve, and a coiled spring having its outer end secured to said gear and its inner end secured to said sleeve.

26. In a motor, a driving shaft rotatably supported on spaced hangers and having a free end extending beyond said hangers, a sleeve mounted on said free end, means for rigidly connecting said sleeve to said shaft, said means comprising interlocking elements between the inner end of said sleeve and said shaft and means for holding said elements in engagement with each other, a winding gear loosely mounted on said sleeve, and a coiled spring having its outer end secured to said gear and its inner end secured to said sleeve.

In witness whereof I have hereunto set my hand this 30th day of April, A. D. 1904.

LOUIS P. VALIQUET.

Witnesses:
ADOLF SCHMINCKE,
FRANK G. SWARTWOUT.